March 27, 1934.  H. W. RUPPLE  1,952,287
SPINDLE STOP FOR AUTOMATIC MACHINES
Filed Aug. 13, 1931   2 Sheets-Sheet 1

INVENTOR.
Harry W. Rupple
BY
Kwis Hudson & Kent.
ATTORNEY.

INVENTOR.
Harry W. Rupple
BY
ATTORNEY.

Patented Mar. 27, 1934

1,952,287

UNITED STATES PATENT OFFICE 1,952,287

SPINDLE STOP FOR AUTOMATIC MACHINES

Harry W. Rupple, Cleveland, Ohio, assignor to The Cleveland Automatic Machine Company, a corporation of Ohio Application August 13, 1931, Serial No. 556,821

2 Claims. (Cl. 29—37)

This invention relates to improvements in metal working machines and more particularly to improvements in machines of the multiple spindle type having several rotatable work-carrying spindles mounted in an indexible turret to successively present the work to a number of forming tools carried in a reciprocating tool turret or slide.

An object of the invention is to provide means whereby a spindle will be automatically disengaged from its driving mechanism and held stationary at one or more stations in the cycle of turret indexing to permit milling, slotting or other operations to be performed upon the work in such spindle.

Another object of the invention is to provide a spindle braking and stopping device of simplified construction and which may be easily and readily removed from the machine when it is desired to continuously rotate the several spindles in each of the forming stations.

Other objects and advantages of the invention will be apparent to those skilled in the art from the following disclosure. To the accomplishment of the foregoing and related ends, said invention consists of the means hereinafter fully described and particularly pointed out in the claims. While the principle of the invention may be embodied in various mechanical forms the preferred embodiment is described in connection with the following drawings, in which:

In machines of this general character, the work which may be in the form of bar stock or individual pieces, is carried by chuck devices mounted upon the forward end of a series of rotatable spindles, customarily supported in equi-spaced relation in an indexible head. The spindle turret is rotatably supported in a spindle head forming a part of the machine frame and is indexed by means of suitable mechanism to advance the several spindles from one tool position to the next commonly called station. Forming tools (not shown) carried in a tool slide mounted on the machine frame in front of the spindles are intermittently reciprocated toward and from the work during each step in the cycle or turret indexing in a manner well known in the art. Other tools in the form of sawing or cut-off devices may be mounted upon slides moving transversely across the front face of the spindle turret.

Figure 2:
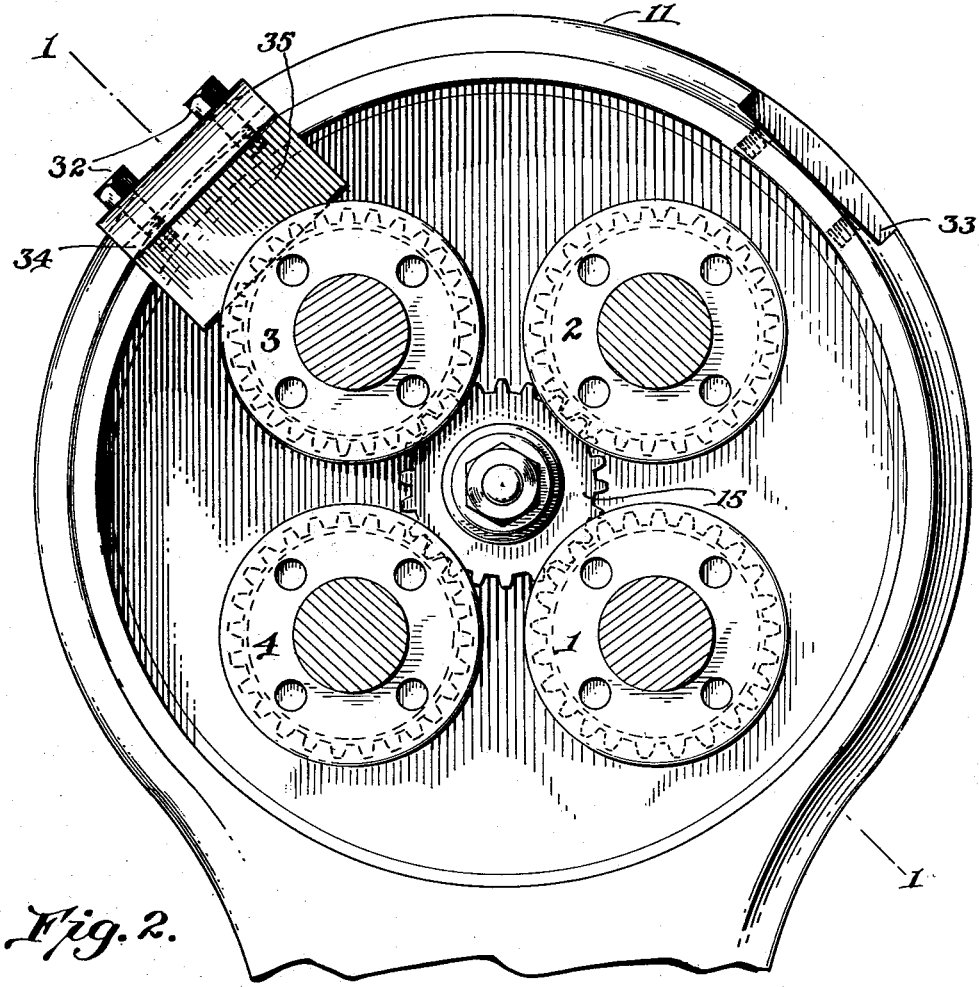
Fig. 2 is a transverse sectional view taken on line 2—2 of Fig. 1, looking in the direction of the arrows.
Figure 3:
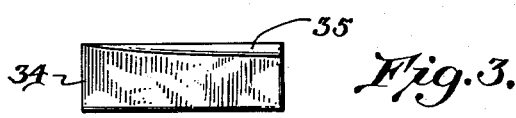
Fig. 3 is a bottom plan view of the spindle stop actuating device.

In illustrating the present invention only that portion of a screw machine, which is directly affected by the present improved device, is shown. In the drawings, the spindle turret is indicated at 10 and the spindle head therefor at 11. The stock spindles 12 are rotatably received in suitable longitudinal apertures 13 in the turret 10, and as shown in Fig. 2 are spaced equidistantly one from the other and from the center or axis of the turret 10. The spindles are rotated by a shaft 14 which also extends longitudinally through the head 10 and carries rearwardly of the latter a gear 15 which meshes with pinions 16 mounted on the several stock spindles 12. In conventional construction the pinions 16 are ordinarily keyed to the spindles 12 and rotate the latter direct from the gear 15.

In the present construction, the pinions 16 are rotatably mounted with respect to the spindles 12 upon hardened sleeves or bushings 17 secured to the spindles and provided with outwardly projecting radial flanges 18 which serve as thrust bearings between the pinions and the rear face 19 of the spindle turret 10. To the rear side of each pinion 16 is secured one member 20 of a clutch device and on the spindles 12 adjacent the members 20 are slidably keyed cooperating clutch members 21. In the illustrated form the member 20 is made integral with pinion 16 and has a conical bore 22 provided in its rear wall, while the member 21 is in the form of a sliding sleeve having its front end tapered correspondingly at 23 to the conical bore 22. When these two members of the clutch device are in engagement, it will be obvious that the gear mounted on the drive shaft 14 will continuously rotate the stock carrying spindles, which condition is normally desired and is maintained by means of compression springs 24 mounted between the rear face of each member 21 and collars 25 adjustably secured by means of a set screw or other well known means not shown, to the spindles 12. The clutch illustrated is of the friction type but it is understood that any form of clutch may be used and in some instances a positive drive clutch may be preferred.

Figure 1:
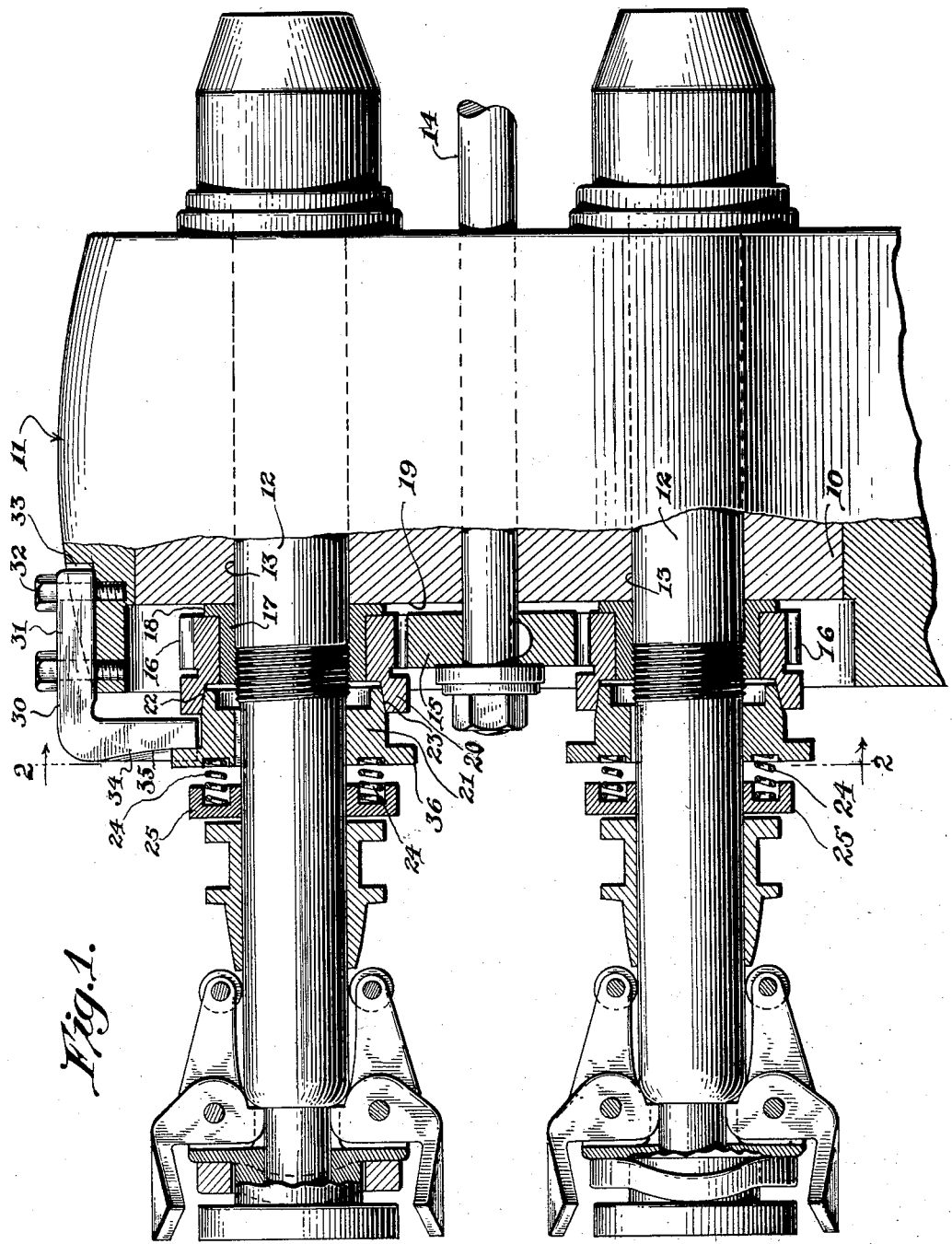
Fig. 1 is a view with part in section on the line 1—1 of Fig. 2, looking in the direction of the arrows, showing a preferred embodiment of the present invention as applied to the spindle turret of a multiple spindle screw machine.

As mentioned hereinbefore, certain forming operations required upon the work may necessitate the temporary stopping of the rotation of the work-carrying spindle at one or more stations in the cycle of machine operation, and the present invention provides a very simple device in the form of a readily removed attachment which may be bolted to the spindle housing adjacent any one of the spindle head stations for temporarily stopping the rotation of a work-carrying spindle. In Fig. 1 this device is illustrated at 30 and consists of an inverted L-shaped member having one leg 31 secured to the spindle head 11 by bolts 32, at cut-away portions 33 radially opposite the spindle station. The other leg 34 of the improved device extends toward the center of the head 10 and has its lower end provided with a cam or taper 35 adapted to engage with an annular flange or rim 36 on the clutch member 21. It will be apparent from the foregoing, that as the spindle turret is indexed from one station to another, the flange 36 of the clutch element 21 will engage with the cam 35 disengaging the clutch faces 22 and 23 and hold the work spindle from rotation while in that station. Friction between the flange 36 of the clutch element 21 and the clutch shifting device 30, produced by the springs 24, prevents rotation of the disengaged spindle.

From the foregoing disclosure, it will be apparent that I have produced a device which may be applied to conventional machines of the type referred to, and which will disconnect the work spindle from its driving means and hold it stationary while in one or more stations. The embodiment described and illustrated is merely the preferred form of the invention and I do not wish to be limited to the particular construction shown which may be varied within the scope of this invention and particularly point out and claim as my invention:

I claim:

1. In a machine tool of the character described, the combination of a spindle head, a spindle turret rotatably supported by said spindle head, a plurality of spindles rotatably supported by said spindle turret and adapted to be indexed through a plurality of stations, means for driving said spindles, said means including a plurality of cooperating clutch elements supported by said spindles, resilient means supported by said spindles adapted to continuously urge said clutch elements into engagement with each other, a flange on one of said clutch elements, means actuated by the indexing of said turret adapted to disengage said clutch elements at one of said stations, said last mentioned means comprising a fixed cam member carried by the spindle head adjacent one of said stations and adapted to be engaged by said flange upon the indexing of said turret.

2. In a machine tool of the character described, the combination of a spindle head, a spindle turret rotatably supported by said spindle head, a plurality of spindles rotatably supported by said spindle turret and adapted to be indexed through a plurality of stations, a driving gear mounted coaxial with the axis of said spindle turret, driven gears rotatably supported by said spindles and continuously in mesh with said driving gear, stationary clutch elements formed on said driven gears, movable clutch elements slidably keyed to said spindles, members fixed to said spindles adjacent said movable clutch elements, resilient means between said members and said movable clutch elements adapted to continuously urge said movable clutch elements into engagement with said stationary clutch elements, a flange on said movable clutch elements, a stationary cam member fixedly secured to said spindle head adjacent one of said stations, a cam surface on said cam member adapted to be engaged by said flanges on said movable clutch elements upon indexing of said turret, whereby said movable clutch member is moved to disengage said clutch and hold the spindle stationary at said station.

HARRY W. RUPPLE.